United States Patent [19]

Nimmersjö et al.

[11] Patent Number: 4,731,689
[45] Date of Patent: Mar. 15, 1988

[54] DIRECTIONAL DETECTION IN CONNECTION WITH FAULTS IN A POWER SUPPLY NETWORK

[75] Inventors: Gunnar Nimmersjö; Murari M. Saha, both of Västerås, Sweden

[73] Assignee: ASEA AB, Sweden

[21] Appl. No.: 30,566

[22] Filed: Mar. 27, 1987

[30] Foreign Application Priority Data

Apr. 8, 1986 [SE] Sweden ................. 8601565

[51] Int. Cl.⁴ ............................................. H01H 3/44
[52] U.S. Cl. ....................................... 361/66; 361/81; 361/86; 564/483; 324/522
[58] Field of Search ................ 361/42, 44, 45, 47, 361/62, 65, 79, 80, 86, 66, 81; 364/483; 324/509, 512, 522

[56] References Cited

U.S. PATENT DOCUMENTS

| | | | |
|---|---|---|---|
| 3,590,368 | 6/1971 | Esclangan | 361/80 X |
| 3,956,671 | 5/1976 | Nimmersjo | 361/65 X |
| 4,351,011 | 9/1982 | Liberman | 361/82 |
| 4,591,992 | 5/1986 | Yamaura | 364/483 |
| 4,636,909 | 1/1987 | Brandt | 361/80 |

FOREIGN PATENT DOCUMENTS

2841009 3/1980 Fed. Rep. of Germany .

Primary Examiner—A. D. Pellinen
Assistant Examiner—Derek S. Jennings
Attorney, Agent, or Firm—Watson Cole et al.

[57] ABSTRACT

A method and a device for directional detection of a fault on a power transmission line extending between two stations (P, Q). In one of the stations (P) there is a travelling wave model which, by means of currents and voltages measured in the station, calculates the voltage distirbution along the line. The direction to a fault is determined by monitoring changes in calculated voltages in the two stations. If a fault occurs between the stations, the voltage change occurring in a station (Q) between the voltage existing prior to a fault and after a fault can be estimated as $|\Delta Uq|$, and the corresponding voltage change occurring in the other station (P) can be estimated as $|\Delta Up|$, whereby according to the invention the difference $|\Delta Uq| - |\Delta Up| > 0$ signifies a fault on the line side of the station (P), i.e. a fault lying ahead of the measuring point. A fault lying behind station P is evidenced when $|\Delta Uq| - |\Delta Up| < 0$.

5 Claims, 11 Drawing Figures

DIRECTIONAL DETECTION IN CONNECTION WITH FAULTS IN A POWER SUPPLY NETWORK

TECHNICAL FIELD

It is important to protect components included in power or transmission networks, such as power lines, busbars, transformers etc. The present invention relates to a method and a device for protection which indicates in which direction, in relation to two or more measuring points, a fault has occurred, a so-called directional comparison protection. In this connection the term "zone of supervision" of a protection device is used, and an internal fault is defined as a fault which lies within the zone of supervision of the protection device. A fault which lies outside the zone of supervision and which can be detected is consequently called an external fault. Starting from a measuring point, directional detection can also be obtained, and in that connection the term "a fault lying ahead" is used when referring to a fault occurring in the direction of supervision of the protection device, and the term "a fault lying behind" is used when referring to a fault occurring in the opposite direction.

BACKGROUND ART

When a fault occurs in a power transmission network, travelling waves arise which move along the line. It is known to use the direction of movement of these travelling waves at a measuring point to determine the direction to the location of the fault. U.S. Pat. No. 3,956,671 (Nimmersjö) discloses how to utilize the fact that in those travelling waves, which from a fault point move in towards the measuring point of the protection device, the current and voltage waves have different signs. If the voltage is designated u, the current i and the wave impedance $Z_0$, the equation $u = -Z_0 i$ is obtained in the case of an internal fault and a fault lying ahead, respectively. If the fault is located behind the measuring point, the current and voltage waves have the same signs, whereby the equation $u = Z_0 i$ is obtained.

U.S. Pat. No. 4,351,011 (Liberman) uses an alternative in which, instead of treating the voltage and current waves separately, the product of voltage and current is formed, i.e. the power or its integral, i.e. the energy. The direction to a fault can then be determined by the sign of the instantaneous power or energy change. For an internal fault or a fault lying ahead, a negative sign is then obtained on the power or energy change, and for an external fault or a fault lying behind, a positive sign is obtained.

In German patent application No. P 28 41 009.5-32, the different algebraical combinations of the voltage and current waves are utilized for obtaining directional detection.

In the specification of U.S. patent application Ser. No. 743,930, filed in the name of G. Nimmersjö on June 12, 1985, a method and a device are described for locating a fault point on a transmission line based on voltage waves moving from a measuring point towards a fault point and corresponding waves reflected from a fault point, which waves are included in a travelling wave model of the line. The invention comprises carrying out, at certain regular time intervals, a measurement of the instantaneous values of the current and the voltage at the end point of the line, for example at a station. With these values and with the aid of the travelling wave model, the voltage at a number of control points along the line can be calculated. It is the travelling wave model described in patent application Ser. No. 743,930 that forms the basis of the directional detection according to the present invention.

SUMMARY OF THE INVENTION

According to the invention a method of determining the location of a fault on a power transmission line extending between two stations P and Q comprises determining the voltages on the line at at least two points using a travelling wave model in one of the stations, monitoring the voltage change $|\Delta U_q|$ occurring in station Q and $|\Delta U_p|$ occurring in station P at relevant times just before and just after the fault arises and determining from the sign of the difference between $|\Delta U_q|$ and $|\Delta U_p|$ where the fault lies relative to the stations.

BRIEF DESCRIPTION OF THE DRAWINGS

The invention will now be described, by way of example, with reference to the accompanying drawings, in which.

DISCLOSURE OF THE INVENTION, THEORETICAL BACKGROUND

Figure 1:
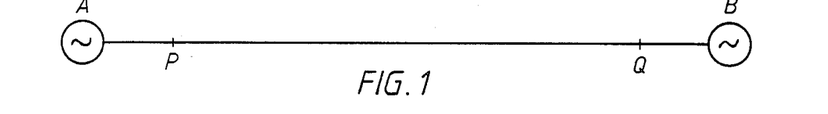
FIG. 1 shows a power transmission line in a faultless state between two stations P and Q which are supplied from two power sources A and B.

FIG. 1 shows a power transmission line between two stations or measuring points P and Q. In the example shown, the line is connected to two power sources A and B. PQ may be conceived to be a transmission line between two networks A and B, a line in a mashed network or a line connecting a power station A with a power drain B.

Figure 2:
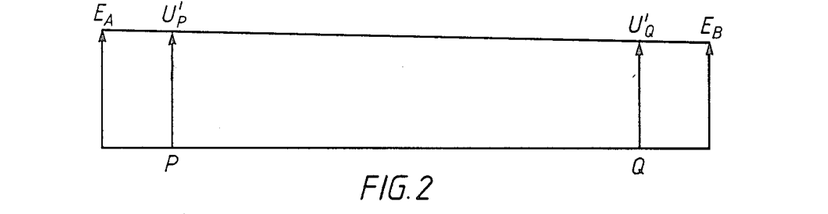
FIG. 2 shows the real, measured voltage distribution along the line according to FIG. 1 between the power sources.

FIG. 2 shows the real voltage distribution along the line in a faultless state, $E_A$ and $E_B$ being the emf's of the respective power sources, and $U'_P$ and $U'_Q$ being the voltages measured at P and at Q, respectively.

Figure 3:
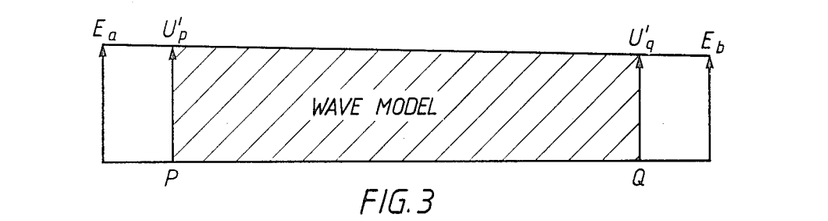
FIG. 3 shows the same voltage distribution, in which the voltage consists of values calculated with a travelling wave model located at P, based on voltage and current values measured at P.

With the aid of current and voltage values measured in stations P and Q, the control voltages or the voltage distribution from P towards Q along the line and from Q towards P in a faultless state can be calculated by means of the travelling wave model described in the above-mentioned U.S. application Ser. No. 743,930 (see FIG. 3). This means that the same voltage distribution as in FIG. 2 is obtained within the limits determined by measurement error in value measuring transformers and by uncertainty in knowledge of other parameters.

When a fault occurs on a line, it is important, as stated above, to be able to determine the direction to the fault. This is done by means of so-called directional detectors. In the directional detectors comprised by this invention, the control voltages which may be obtained with the aid of the travelling wave model are utilized.

By studying the change in the control voltages in that point which corresponds to the measuring point and that point which lies at the opposite end point of the line, the direction to the fault can be determined. This comparison can be made as regards phase voltage, principal voltage, zero sequence voltage or some other asymmetrical component.

Figure 4:
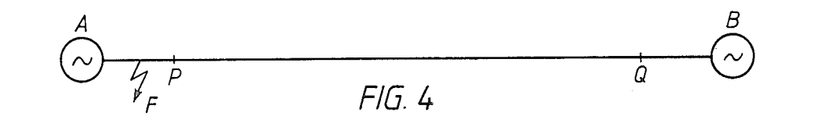
FIG. 4 shows the same power transmission line as in FIG. 1 when a fault F has occurred between station P and power source A.

A fault which occurs in some part of the network connected to the measuring point of the protected line, for example at F according to FIG. 4, propagates as a voltage wave on the line. The changes occurring in the control voltages can first be indicated in that control voltage which corresponds to the voltage at the measuring point or possibly in a symbolic contol voltage behind the measuring point, viewed from the line. Then the change is propagated to the control voltages which are located further out on the line. The change of the control voltages occurs in a chronological order which is dependent on the direction of movement of the change on the line. The change is instantaneous in magnitude and smaller in amplitude the further out on the line it occurs. This makes it possible to detect the direction by comparison of instantaneous values or mean values for a suitably selected period of time.

Figure 5:
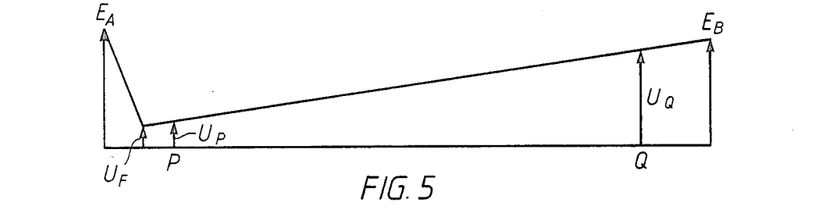
FIG. 5 shows the real voltage distribution along the line when a fault according to FIG. 4 has occurred.
Figure 6:
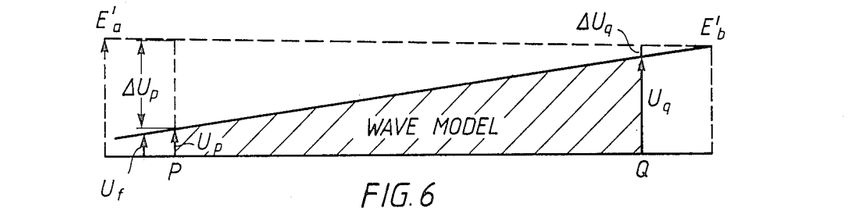
FIG. 6 shows the voltage distribution along the line calculated by a travelling wave model at P in the case of a fault according to FIG. 4.

The real voltage distribution along the line in the case of a fault F between A and P is clear from FIG. 5. The calculated distribution of the control voltage along the line is clear from FIG. 6. Voltages with index p designate the voltage at the measuring point P and voltages with index q designate the voltage at Q. From FIG. 5 it is clear that if $|\Delta U_q| - |\Delta U_p| < 0$, there is a fault on the station side of P, that is, a fault lying behind.

Figure 7:
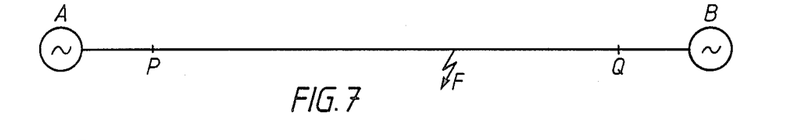
FIG. 7 shows the same power transmission line as in FIG. 1, in which a fault F has occurred between P and Q.

In the event of a fault on the line, for example at F according to FIG. 7, the mathematical model in the protection device is valid for the distance to the fault point. Owing to the fact that the evaluation takes place with a lag corresponding to the transit time of the voltage wave from one end to the other of the protected line, a change in the control voltages of the model will only be discovered in the control voltage corresponding to the remote end point or a fictitious voltage in an imaginary extension of the line. The magnitude of the change will also be instantaneous and greatest in amplitude at the remotest control point.

Figure 8:
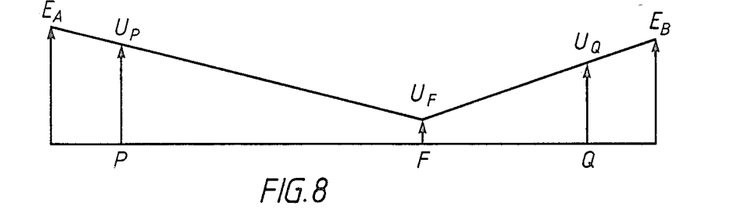
FIG. 8 shows the measured voltage along the line after the occurrence of a resistance ground fault at F.
Figure 9:
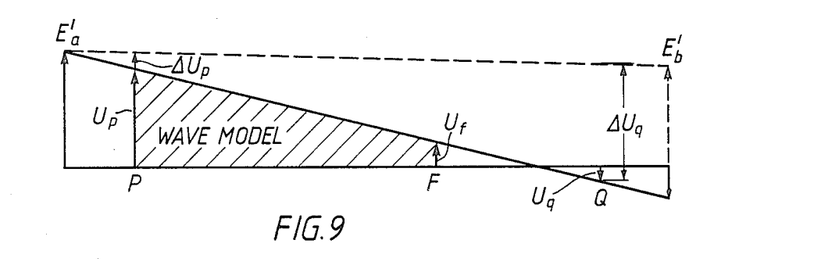
FIG. 9 shows the voltage distribution along the line calculated by a travelling wave model at P in the case of a fault according to FIG. 7.

The real voltage distribution in the case of a fault according to FIG. 7 is clear from FIG. 8. The corresponding model voltage is clear from FIG. 9, from which it is also clear that when $|\Delta U_q| - |\Delta U_p| > 0$, there is fault on the line side of P, that is, a fault lying ahead.

A comparison between the changes of the control voltages, which may also include the change caused by a zero sequence or negative sequence voltage occurring in the case of unsymmetrical faults—both their consecutive occurrence in time and their different instantaneous values or mean values—provides a very reliable directional detection of the voltage waves which are propagated on the line from the location of the fault.

This invention relates to a method for checking and evaluating changes in the control voltages in the event of a fault for directional detection and phase selection, i.e. for determining a faulty phase or faulty phases. This can be carried out as an inspection of principal voltages, phase voltages and the zero sequence voltage. If, for example, a single-phase fault occurs, say in phase R, no change in the voltage between S and T is obtained. A ground fault can be detected by studying the change of the zero sequence voltage and any unsymmetrical fault can be detected by studying the negative sequence voltage.

Directional detection and phase selection take place by generating the difference between the changes of the control voltages at the two end points of the line. Since the line can be assumed to have the same impedance for negative sequence as for positive sequence, the phase selection logic introduced in the system is valid.

The theoretical background of the invention will be described by way of a number of examples showing typical fault occurrences. The following analysis deals with stationary conditions, and $\Delta I$ designates a stationary fault current which is superimposed on the state prevailing before a fault.

The following designations are used:

Index p represents the quantity at the measuring point P, and index q represents the quantity at the opposite end of the transmission line. $\Delta I$ is the current floating at the location of the fault. It is distributed such that $K_1\Delta I$ is the positive sequence component, $K_2\Delta I$ is the negative sequence component and $K_0\Delta I$ is the zero sequence component of the current at the measuring point P. The K-factors, i.e. the distribution factors for the respective component of the current at the fault point, depend on where the fault occurs. $Z_{A1}$, $Z_{A2}$ and $Z_{A0}$ are source impedances seen from the measuring point of the protection device. $Z_1$ and $Z_0$ are the impedance of the transmission line ($Z_2=Z_1$). U' is the voltage prevailing at the measuring point prior to the occurrence of a fault.

For a single-phase ground fault in phase R, i.e. RN, the control voltage of the measuring point can be expressed as:

$$U_{Rp} = U'_{Rp} - \Delta I(K_1 Z_{A1} + K_2 Z_{A2} + K_0 Z_{A0}) \quad (1)$$

$$U_{Sp} = U'_{Sp} - \Delta I(a^2 K_1 Z_{A1} + a K_2 Z_{A2} + K_0 Z_{A0}) \quad (2)$$

$$U_{Tp} = U'_{Tp} - \Delta I(a K_1 Z_{A1} + a^2 K_2 Z_{A2} + K_0 Z_{A0}) \quad (3)$$

The control voltage of the remote end point can be expressed as follows with the data of the measuring points:

$$U_{Rq} = U'_{Rq} - \Delta I[K_1(Z_{A1}+Z_1) + K_2(Z_{A2}+Z_1) + K_0(Z_{A0}++Z_0)] \quad (4)$$

$$U_{Sq} = U'_{Sq} - \Delta I[a^2 K_1(Z_{A1}+Z_1) + a K_2(Z_{A2}+Z_1) + K_0(Z_{A0}++Z_0)] \quad (5)$$

$$U_{Tq} = U'_{Tq} - \Delta I[a K_1(Z_{A1}+Z_1) + a^2 K_2(Z_{A2}+Z_1) + K_0(Z_{A0}++Z_0)] \quad (6)$$

The voltage change at the measuring point during the first half-period after a fault is thus as follows:

$$\Delta U_{Rp} = -\Delta I(K_1 Z_{A1} + K_2 Z_{A2} + K_0 Z_{A0}) \quad (7)$$

$$\Delta U_{Sp} = -\Delta I(a^2 K_1 Z_{A1} + a K_2 Z_{A2} + K_0 Z_{A0}) \quad (8)$$

$$\Delta U_{Tp} = -\Delta I(aK_1 Z_{A1} + a^2 K_2 Z_{A2} + K_0 Z_{A0}) \quad (9)$$

and the corresponding voltage change at the remote end point is as follows:

$$\Delta U_{Rq} = -\Delta I[K_1(Z_{A1}+Z_1) + K_2(Z_{A2}+Z_1) + K_0(Z_{A0}+Z_0)] \quad (10)$$

$$\Delta U_{Sq} = -\Delta I[a^2 K_1(Z_{A1}+Z_1) + aK_2(Z_{A2}+Z_1) + K_0(Z_{A0}++Z_0)] \quad (11)$$

$$\Delta U_{Tq} = -\Delta I[aK_1(Z_{A1}+Z_1) + a^2 K_2(Z_{A2}+Z_1) + K_0(Z_{A0}++Z_0)] \quad (12)$$

The zero sequence voltage, i.e., the sum voltage, is as follows:

$$\left| \sum_{RST} \Delta U_{iq} \right| = 3 \mid Z_{A0} + Z_0 \mid \cdot \mid K_0 \Delta I \mid \quad (13)$$

$$\left| \sum_{RST} \Delta U_{ip} \right| = 3 \mid Z_{A0} \mid \cdot \mid K_0 \Delta I \mid \quad (14)$$

The following expression can be set:

$$\Delta U_{Opq} = 3(\mid Z_{A0} + Z_0 \mid - \mid Z_{A0} \mid) \cdot \mid K_0 \Delta I \mid \quad (15)$$

Provided that $|Z_0| >> |Z_{A0}|$ or $\arg(Z_{A0}) \approx \arg(Z_0)$, the increase of the sum voltage between the control points p and q in the line model can be written as follows:

$$\Delta U_{Opq} \approx \pm 3 |Z_0| \cdot |K_0 \Delta I| \quad (16)$$

where + relates to a fault lying ahead and − relates to a fault lying behind. It should be pointed out that K is a function of the fault point and thus has different values for faults lying ahead and faults lying behind.

In the same way, expressions for the change of the principal voltages along the line are derived:

$$\Delta U_{RSpq} \approx \pm 3|Z_1| \cdot |K_1 \Delta I| \quad (17)$$

$$\Delta U_{STpq} \approx 0 \quad (18)$$

and $$\Delta U_{TRpq} \approx \pm 3|Z_1| \cdot |K_1 \Delta I| \quad (19)$$

To sum up, for a single-phase ground fault, RN, lying ahead of the measuring point the following expressions are valid:

$$\begin{cases} \Delta U_{Opq} \cong 3 \mid Z_0 \mid \cdot \mid K_0 \Delta I \mid \\ \Delta U_{RSpq} \cong 3 \mid Z_1 \mid \cdot \mid K_1 \Delta I \mid \\ \Delta U_{STpq} \cong 0 \text{ and} \\ \Delta U_{TRpq} \cong 3 \mid Z_1 \mid \cdot \mid K_1 \Delta I \mid \end{cases} \quad (20)$$

and for a single-phase fault RN lying behind, the following expressions are valid:

$$\begin{cases} \Delta U_{Opq} \cong -3 \mid Z_0 \mid \cdot \mid K_0 \Delta I \mid \\ \Delta U_{RSpq} \cong -3 \mid Z_1 \mid \cdot \mid K_1 \Delta I \mid \\ \Delta U_{STpq} \cong 0 \text{ and} \\ \Delta U_{TRpq} \cong -3 \mid Z_1 \mid \cdot \mid K_1 \Delta I \mid \end{cases} \quad (21)$$

Thus, a directional detection and a phase selection are obtained by means of this method.

For a two-phase short-circuit between the S- and T-phases, the following result is obtained in the case of a fault lying ahead:

$$\begin{cases} \Delta U_{Opq} \cong 0 \\ \Delta U_{RSpq} \cong \sqrt{3} \mid Z_1 \mid \cdot \mid K_1 \Delta I \mid \\ \Delta U_{STpq} \cong 2\sqrt{3} \mid Z_1 \mid \cdot \mid K_1 \Delta I \mid \\ \Delta U_{TRpq} \cong \sqrt{3} \mid Z_1 \mid \cdot \mid K_1 \Delta I \mid \end{cases} \quad (22)$$

and the following result is obtained in the case of a fault lying behind:

$$\begin{cases} \Delta U_{Opq} \cong 0 \\ \Delta U_{RSpq} \cong -\sqrt{3} \mid Z_1 \mid \cdot \mid K_1 \Delta I \mid \\ \Delta U_{STpq} \cong -2\sqrt{3} \mid Z_1 \mid \cdot \mid K_1 \Delta I \mid \\ \Delta U_{TRpq} \cong -\sqrt{3} \mid Z_1 \mid \cdot \mid K_1 \Delta I \mid \end{cases} \quad (23)$$

In the case of a two-phase ground fault, STN, the conditions for calculating the voltage changes will be somewhat more complex. However, it can be shown that in order to indicate how large a part of the fault current $\Delta I$ at the measuring point is zero sequence current and negative sequence current, respectively, the zero sequence component $K_0 \Delta I$ shown above must be multiplied by a factor $C_0$ and the negative sequence component $K_2 \Delta I$ shown above must be multiplied by a factor $C_2$. In this $$C_0 = \frac{Z_2}{Z_2 + Z_0} \text{ and } C_2 = \frac{Z_0}{Z_2 + Z_0}.$$

Thus, the zero sequence component of the fault current $\Delta I$ is $K_0 C_0 \Delta I$ and the negative sequence component is $K_2 C_2 \Delta I$.

In this case the following is obtained $$\begin{cases} \Delta U_{Opq} \cong 3 \mid Z_0 \mid \cdot \mid C_0 K_0 \Delta I \mid \\ \Delta U_{RSpq} \cong \sqrt{3} \mid a + 1 - C_2 \mid \cdot \mid Z_1 \mid \cdot \mid K_1 \Delta I \mid \\ \Delta U_{STpq} \cong \sqrt{3} \mid 1 + C_2 \mid \cdot \mid Z_1 \mid \cdot \mid K_1 \Delta I \mid \\ \Delta U_{TRpq} \cong \sqrt{3} \mid 1 - (1 + a)C_2 \mid \cdot \mid Z_1 \mid \cdot \mid K_1 \Delta I \mid \end{cases} \quad (24)$$

in the case of a fault lying ahead, and the following is obtained $$\begin{cases} \Delta U_{Opq} \cong -3 \mid Z_0 \mid \cdot \mid C_0 K_0 \Delta I \mid \\ \Delta U_{RSpq} \cong -\sqrt{3} \mid a + 1 - C_2 \mid \cdot \mid Z_1 \mid \cdot \mid K_1 \Delta I \mid \\ \Delta U_{STpq} \cong -\sqrt{3} \mid 1 + C_2 \mid \cdot \mid Z_1 \mid \cdot \mid K_1 \Delta I \mid \\ \Delta U_{TRpq} \cong -\sqrt{3} \mid 1 - (1 + a)C_2 \mid \cdot \mid Z_1 \mid \cdot \mid K_1 \Delta I \mid \end{cases} \quad (25)$$

in the case of a fault lying behind.

For a three-phase symmetrical fault the following is obtained $$\begin{cases} \Delta U_{Opq} = 0 \\ \Delta U_{RSpq} = \sqrt{3} \mid Z_1 \mid \cdot \mid K_1 \Delta I \mid \\ \Delta U_{STpq} = \sqrt{3} \mid Z_1 \mid \cdot \mid K_1 \Delta I \mid \\ \Delta U_{TRpq} = \sqrt{3} \mid Z_1 \mid \cdot \mid K_1 \Delta I \mid \end{cases} \quad (26)$$

in the case of a fault lying ahead, and the following is obtained $$\begin{cases} \Delta U_{Opq} = 0 \\ \Delta U_{RSpq} = -\sqrt{3} \mid Z_1 \mid \cdot \mid K_1 \Delta I \mid \\ \Delta U_{STpq} = -\sqrt{3} \mid Z_1 \mid \cdot \mid K_1 \Delta I \mid \\ \Delta U_{TRpq} = -\sqrt{3} \mid Z_1 \mid \cdot \mid K_1 \Delta I \mid \end{cases} \quad (27)$$

in the case of a fault lying behind.

It can also be proved that it is possible to use the described method for determining direction in the case of a fault on series-compensated transmission lines and for other conceivable cases of fault.

The described voltage differences can be formed as $$\Delta u = u(t) + u(t - T/2) \quad (28)$$

where T is the period. In a sampled system there is obtained, in similar manner, for the k'th measurement per period $$\Delta u_k = u_k + u_{k-N/2} \quad (29)$$

where $N = T/\Delta t$ and where $\Delta t =$ the time between the samples.

An adaptive filter, in the sense that N is determined with the aid of the zero passages of the preceding periods, can be used. In that case the influence of slow frequency changes upon oscillations is prevented.

The zero sequence quantities are generated as follows:

$$3 \cdot \mid \Delta u_{Opk} \mid = \mid \Delta u_{Rpk} + \Delta u_{Spk} + \Delta u_{Tpk} \mid \quad (30)$$

$$3 \cdot \mid \Delta u_{Oqk} \mid = \mid \Delta u_{Rqk} + \Delta u_{Sqk} + \Delta u_{Tqk} \mid \quad (31)$$

$$\Delta u_{Opqk} = \mid \Delta u_{Oqk} \mid - \mid \Delta u_{Opk} \mid \quad (32)$$

For each principal voltage the following equations are formed:

$$\mid \Delta u_{\sigma pk} \mid = \mid \Delta u_{\sigma pk} - \Delta u_{ppk} \mid \quad (33)$$

$$\mid \Delta u_{\sigma qk} \mid = \mid \Delta u_{\sigma qk} - \Delta u_{pqk} \mid \quad (34)$$

$$\mid \Delta u_{\sigma pqk} \mid = \mid \Delta u_{\sigma qk} \mid - \mid \Delta u_{\sigma pk} \mid \quad (35)$$

To obtain as representative voltage values as possible, some form of mean value generation should be resorted to.

An example of this is clear from the following:

$$\overline{\Delta u}_{Opqk} = (\Delta u_{Opqk}) - (\Delta u_{Opq(k-N/2)}) + \overline{\Delta u}_{Opq(k-1)} \quad (36)$$

$$\overline{\Delta u}_{\sigma pqk} = (\Delta u_{\sigma pqk}) - (\Delta u_{\sigma pq(k-N/2)}) + \overline{\Delta u}_{\sigma pq(k-1)} \quad (37)$$

In summary, on the basis of the equations (20) and (21) it can be determined that a fault lying ahead exists when $\overline{\Delta u}_{Opq}$ is greater than a chosen level of detection $u_{Od}$ and when $\overline{\Delta u}_{\sigma pq}$ is greater than a chosen level of detection $u_d$. In a similar manner it can be determined that when $\overline{\Delta u}_{Opq}$ is smaller than $-u_{Ob}$, i.e. a chosen level of detection $u_{Ob}$, and when $\overline{\Delta u}_{\sigma pq}$ is smaller than $-u_b$, i.e. a chosen level of detection $u_b$, then a fault lying behind exists. If the positive or negative values are, respectively, greater than or smaller than the levels of detection, a fault exists and then the directional detectors are to deliver a signal indicating this. For the further signal processing it is convenient to resort to Boolean quantities. On the basis of the illustrated examples of faults, it can be generally stated that when $\overline{\Delta u}_{Opqk} > u_{Od}$, a signal DO=1 is obtained indicating a ground fault lying ahead, when $\Delta u_{pqk} < -u_{Ob}$, a signal BO=1 is obtained indicating a ground fault lying behind, when $\Delta u_{\sigma pqk} > u_d$, a signal $D_{p\sigma} = 1$ is obtained indicating a fault lying ahead, and when $\Delta u_{\sigma pqk} < -u_b$, a signal $B_{p\sigma} = 1$ is obtained indicating a fault lying behind. For determining a faulty phase, or faulty phases, in the case of a fault, equation (20) can be used as starting-point as well, from which it follows that a fault in phase R, called FR, is obtained when, expressed in Boolean terms, $FR = DRS \cdot \overline{DST} \cdot DTR \cdot DO$.

For a two-phase fault in the form of a short-circuit between the R- and S-phases, a fault in phase R will, of course, also be indicated. The conditions are also clear from equation (20), which means that the complete phase selection for the faulty phase R is determined by $$FR = DRS \cdot \overline{DST} \cdot DTR \cdot DO + DRS \cdot DST \cdot DTR \quad (38)$$

or $FR = DRS \cdot DTR$ if DO is not used.

The corresponding phase selection for faults in phases S and T can be derived in a simple manner as follows $$FS = DRS \cdot DST \cdot \overline{DTR} \cdot DO + DRS \cdot DST \cdot DTR \quad (39)$$

$$(FS = DRS \cdot DST)$$

$$FT = \overline{DRS} \cdot DST \cdot DTR \cdot DO + DRS \cdot DST \cdot DTR \quad (40)$$

$$(FT = DST \cdot DTR)$$

PREFERRED EMBODIMENTS

Figure 10:
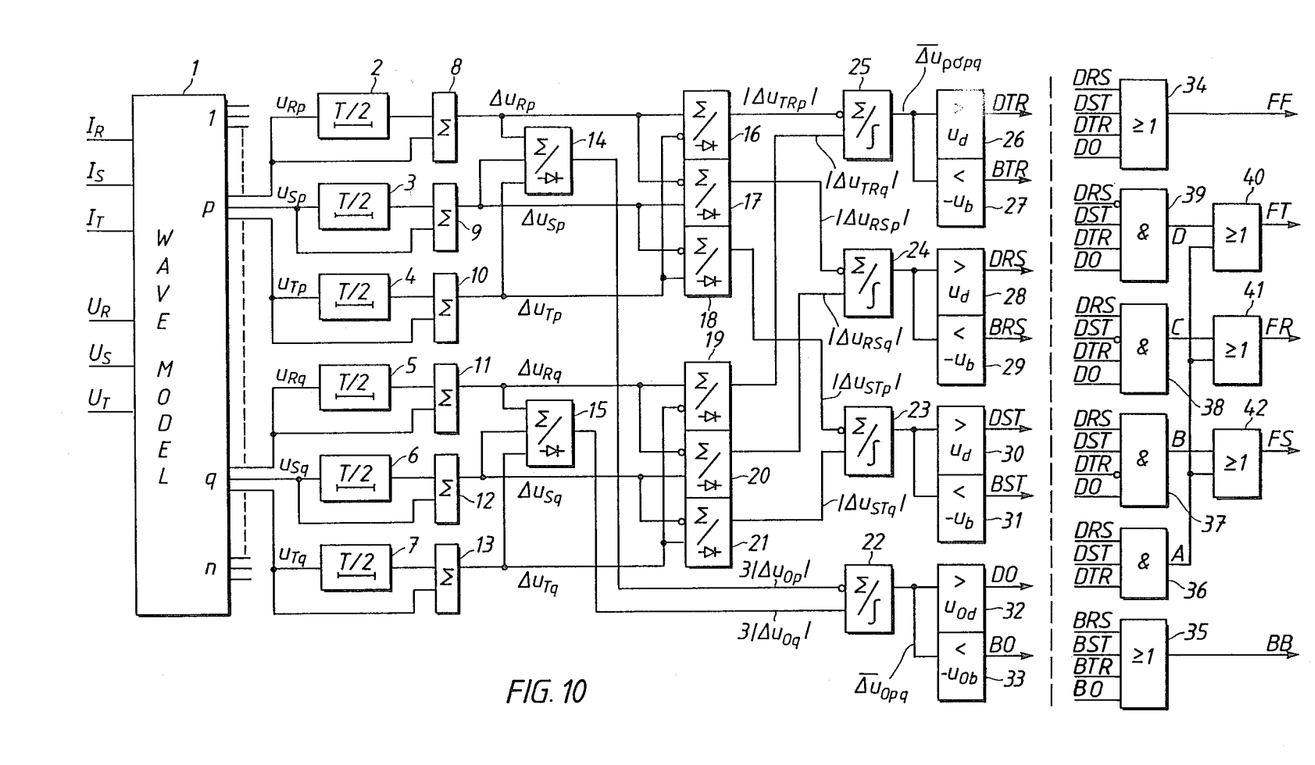
FIG. 10 shows a device for carrying out the invention.

A direction-detecting protection device with ancillary functions according to the invention can be designed as shown in FIG. 10. Phase currents $I_R$, $I_S$ and $I_T$ and phase voltages $U_R$, $U_S$ and $U_T$ are supplied to a device, located at some measuring point, comprising a travelling wave model 1 of the type described above. With the aid of the supplied currents and voltages, the general travelling wave model can indicate the voltage at a number of control points 1 to n along the transmission line. What is necessary for the directional detection according to this invention are really only voltages at the control points P and Q. This means that a simplified version of the travelling wave model may also be used if it is only to be used in connection with directional detection.

Changes $\Delta u$ in the phase voltages of the control voltages are obtained by adding the voltage values of two consecutive half-periods. The time shift is obtained by means of the time delay elements 2-7 and the summation in the summation members 8-13. This part of the device corresponds to equation (28) or (29).

It would also be possible to form the voltage change $\Delta u$ by comparing the voltage values for one period with the corresponding values during the preceding period. The time delay elements 2-7 must then provide a displacement corresponding to the time T for one period. The voltage value for each period must then be formed as a mean value or some other characteristic measure of values during one period. To generate the difference, the time-shifted value must now be supplied to summation members with a negative sign. This process has not been illustrated in FIG. 10.

In the summation members 14 and 15 the zero sequence quantities according to equations (30) and (31) are formed. The valve symbol in boxes 14 and 15—as well as other boxes in FIG. 10—indicate that a rectification of the measured values takes place in connection with the summing up. If the negative sequence voltage is to be used for directional detection, this component can be obtained by a known type of negative sequence filter.

For each principal voltage, the voltage differences $|\Delta u_{p\sigma p}|$ and $|\Delta u_{p\sigma q}|$ are generated in the summation members 16–21 in accordance with equations (33) and (34).

The difference between the difference voltages calculated at P and Q—i.e. as regards the zero sequence voltage $\Delta u_{Opq}$ according to equation (32) and as regards the principal voltage $\Delta u_{p\sigma pq}$ according to equation (35)—is generated in the summation members 22, 23 and 24, 25, respectively. The integral sign in these summation members indicates that a generation of a mean value is performed in connection with the summation. Such a generation of mean value according to equation (36) or (37) may, for example, take place according to FIG. 11.

In the comparison devices 26–33 according to FIG. 10, the differences obtained are compared with the levels of detection $u_d$, $-u_b$, $u_{Od}$ and $-u_{Ob}$, mentioned in the description, from which Boolean signals are obtained in the form of a "1" when the positive values exceed the levels of detection and when the negative values are lower than the levels of detection, respectively. The signals obtained, identified as DTR, DRS, DST, BTR, BRS, BST, DO and BO, are then used for determining the direction to a fault, for phase selection logic and for blocking.

The "or"-element 34 is supplied with all the D-signals, i.e. DRS, DST, DTR and DO. When any of these consists of a "1", this means that there is a fault lying ahead, which leads to the output FF becoming "1", and the requisite measures for disconnection are initiated, e.g. sending a trip signal to the opposite station in a so-called permissive system.

In similar manner, all the B-signals, i.e. BRS, BST, BTR and BO, are applied to an "or"-element 35 and when any of the signals is activated, a signal BB is obtained for blocking the tripping of the circuit-breakers on the opposite side of the line in a so-called blocking system.

The phase selection logic according to the Boolean equations (38), (39) and (40) are executed by means of the "and"-elements 36, 37, 38 and 39 with the outputs A, B, C and D and the "or"-elements 40, 41 and 42. The respective signals FT, FR and FS indicate a fault in the respective phase and can, of course, also be used in connection with disconnection of a faulty phase.

Figure 11:
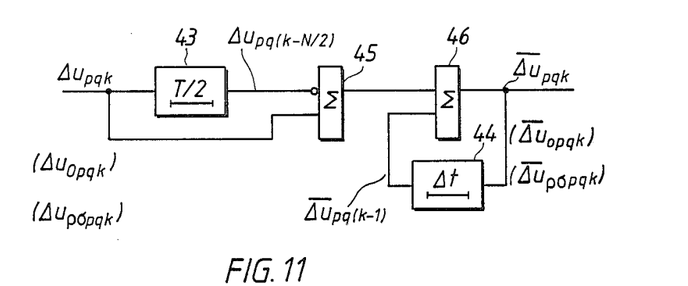
FIG. 11 shows a method for generating a mean value.

As mentioned above, the generation of a mean value according to equations (36) and (37) can be performed with a scheme according to FIG. 11. The scheme as such is relatively trivial and consists of two time delay elements 43 and 44 and two summation members 45 and 46.

The components included in the device, such as travelling wave model, summation members, comparison members, time delay elements, etc., can be designed as more or less integrated solutions based on analog or digital techniques.

In addition to being alternatively formed on the basis of digital or analog techniques, the travelling wave model may be a complete such model, whereby the voltage distribution along the entire transmission line can be obtained, or it may be a simplified variant, whereby only control voltages at P and Q are available.

What is claimed is:

1. A method for directional detection of a fault on a power transmission line extending between two stations (P, Q) included in a multi-phase electrical power transmission system, in which measurement at least one of the stations is carried out, in each phase, of current ($i_R$, $i_S$, $i_T$) and of voltage ($u_R$, $u_S$, $u_T$) and the measured values are supplied to a travelling wave model by means of which the voltages are obtained at least at two points on the line, comprising:

generating $\Delta u_{Opq}$ as the difference between a change in the zero sequence voltage, calculated with the aid of the travelling wave model, between two consecutive time periods in station Q and the corresponding change in the zero sequence voltage in station P, generating $\Delta u_{RSpq}$ as the difference between a change in the principal voltage, calculated with the aid of the travelling wave model, between phases R and S between two consectutive time periods in station Q and the corresponding change in the principal voltage in station P, generating $\Delta u_{STpq}$ as the difference between a change in the principal voltage, calculated with the aid of the travelling wave model, between the phases S and T between two consecutive time periods in station Q and the corresponding change in principal voltage in station P, generating $\Delta u_{TRpq}$ as the difference between a change in the principal voltage, calculated with the aid of the travelling wave model, between phases T and R between two consecutive time periods in station Q and the corresponding change in principal voltage in station P, a fault lying ahead (FF) is indicated when $\Delta u_{Opq}$ is greater than $u_{Od}$ or when either $\Delta u_{RSpq}$, $\Delta u_{STpq}$, or $\Delta u_{TRpq}$ is greater than $u_d$, where $u_{Od}$ and $u_d$ are selected levels of detection, and a fault lying behind (BB) is indicated when $\Delta u_{Opq}$ is smaller than $-u_{Ob}$ or when either $\Delta u_{RSpq}$, $\Delta u_{STpq}$ or $\Delta u_{TRpq}$ is smaller than $-u_b$, where $-u_{Ob}$ and $-u_b$ are selected levels of detection.

2. A method according to claim 1, wherein a fault is indicated in phase R (FR) when either $\Delta u_{Opq}$ is greater than $u_{Od}$ and $\Delta u_{RSpq}$ and $\Delta u_{TRpq}$ are greater than $u_d$ and $\Delta u_{STpq}$ is smaller than $u_d$, or when $\Delta u_{RSpq}$ and $\Delta u_{STpq}$ and $\Delta u_{TRpq}$ are greater than $u_d$, a fault is indicated in phase S (FS) when either $\Delta u_{Opq}$ is greater than $u_{Od}$ and $\Delta u_{RSpq}$ and $\Delta u_{STpq}$ are greater than $u_d$ and $\Delta u_{TRpq}$ is smaller than $u_d$ or when $\Delta u_{RSpq}$ and $\Delta u_{STpq}$ and $\Delta u_{TRpq}$ are greater than $u_d$, and a fault is indicated in phase T(FT) when either $\Delta u_{Opq}$ is greater than $u_{Od}$ and $\Delta u_{STpq}$ and $\Delta u_{TRpq}$ are greater than $u_d$ and $\Delta u_{RSpq}$ is smaller than $u_d$ or when $\Delta u_{RSpq}$ and $\Delta u_{STpq}$ and $\Delta u_{TRpq}$ are greater than $u_d$.

3. A device for the directional detection of a fault on an electrical power transmission line extending between two stations (P, Q) included in a multi-phase electrical power transmission system, which device, located in one of the stations, comprises a travelling wave model, comprising:

- a first summation member adapted to generate a difference voltage $\Delta u_{Rp}$ equal to the difference between an R-phase voltage in station P, calculated by means of the travelling wave model, and the corresponding voltage one time period earlier,
- a second summation member adapted to generate a difference voltage $\Delta u_{Sp}$ equal to the difference between an S-phase voltage in station P, calculated by means of the travelling wave model, and the corresponding voltage one time period earlier,
- a third summation member adapted to generate a difference voltage $\Delta u_{Tp}$ equal to the difference between a T-phase voltage in station P, calculated by means of the travelling wave model, and the corresponding voltage one time period earlier,
- a fourth summation member adapted to generate a difference voltage $\Delta u_{Rq}$ equal to the difference between an R-phase voltage in station Q, calculated by means of the travelling wave mode, and the corresponding voltage one time period earlier,
- a fifth summation member adapted to generate a difference voltage $\Delta u_{Sq}$ equal to the difference between an S-phase voltage in station Q, calculated by means of the travelling wave model, and the corresponding voltage one time period earlier,
- a sixth summation member adapted to generate a difference voltage $\Delta u_{Tq}$ equal to the difference between a T-phase voltage in station Q, calculated by means of the travelling wave model, and a corresponding voltage one time period earlier,
- a seventh summation member adapted to generate a numerical value of the change in the zero sequence voltage, $3|\Delta u_{Op}| == |\Delta u_{Rp} + \Delta u_{Sp} + \Delta u_{Tp}|$, in station P,
- an eighth summation member adapted to generate a numerical value of the change in the zero sequence voltage, $3|\Delta u_{Oq}| == |\Delta u_{Rq} + \Delta u_{Sq} + \Delta u_{Tq}|$ in station Q,
- a ninth summation member adapted to generate a numerical value of the change in the principal voltage between phases T and R, $|\Delta u_{TRp}| = |\Delta u_{Rp} - \Delta u_{Tp}|$, in station P,
- a tenth summation member adapted to generate a numerical value of the change in the principal voltage between phases R and S, $|\Delta u_{RSp}| = |\Delta u_{Sp} - \Delta u_{Rp}|$, in station P,
- an eleventh summation member adapted to generate a numerical value of the change in the principal voltage between phases S and T, $|\Delta u_{STp}| = |\Delta u_{Tp} - \Delta u_{Sp}|$, in station P,
- a twelfth summation member adapted to generate a numerical value of the change in the principal voltage between phases T and R, $|\Delta u_{TRq}| = |\Delta u_{Rq} - \Delta u_{Tq}|$, in station Q,
- a thirteenth summation member adapted to generate a numerical value of the change in the principal voltage between phases R and S, $|\Delta u_{RSq}| = |\Delta u_{Sq} - \Delta u_{Rq}|$, in station Q,
- a fourteenth summation member adapted to generate a numerical value of the change in the principal voltage between phases T and S, $|\Delta u_{STq}| = |\Delta u_{Tq} - \Delta u_{Sq}|$, in station Q,
- a fifteenth summation member adapted to generate a mean value $\overline{\Delta u}_{Opq}$ of the change in the zero sequence voltage $\Delta u_{Opq} == |\Delta u_{Oq}| - |\Delta u_{Op}|$ between stations P and Q,
- a sixteenth summation member adapted to generate a mean value $\overline{\Delta u}_{STpq}$ of the change in the principal voltage between phases S and T, $\Delta u_{STpq} = |\Delta u_{STq}| - |\Delta u_{STp}|$, between stations P and Q,
- a seventeenth summation member adapted to generate a mean value $\overline{\Delta u}_{RSpq}$ of the change in the principal voltage between phases R and S, $\Delta u_{RSpq} = |\Delta u_{RSq}| - |\Delta u_{RSp}|$, between stations P and Q,
- an eighteenth summation member adapted to generate a mean value $\overline{\Delta u}_{TRpq}$ of the change in the principal voltage between phases T and R, $\Delta u_{TRpq} = |\Delta u_{TRq}| - |\Delta u_{TRp}|$,
- a first comparison element adapted to compare $\overline{\Delta u}_{TRpq}$ with a selected voltage level $u_d$ and, when $\overline{\Delta u}_{TRpq}$ is greater than said voltage level, to deliver a logical "1"-signal on its output DTR,
- a second comparison element adapted to compare $\overline{\Delta u}_{TRpq}$ with a selected voltage level $-u_b$ and, when $\overline{\Delta u}_{TRpq}$ is lower than said voltage level, to deliver a logical "1"-signal on its output BTR,
- a third comparison element adapted to compare $\overline{\Delta u}_{RSpq}$ with a selected voltage level $u_d$ and, when $\overline{\Delta u}_{RSpq}$ is greater than said voltage level, to deliver a logical "1"-signal on its output DRS,
- a fourth comparison element adapted to compare $\overline{\Delta u}_{RSpq}$ with a selected voltage level $-u_b$ and, when $\overline{\Delta u}_{RSpq}$ is smaller than said voltage level, to deliver a logical "1"-signal on its output BRS,
- a fifth comparison element adapted to compare $\overline{\Delta u}_{STpq}$ with a selected voltage level $u_d$ and, when $\overline{\Delta u}_{STpq}$ is greater than said voltage level, to deliver a logical "1"-signal on its output DST,
- a sixth comparison element adapted to compare $\overline{\Delta u}_{STpq}$ with a selected voltage level $-u_b$ and, when $\overline{\Delta u}_{STpq}$ is smaller than said voltage level, to deliver a logical "1"-signal on its output BST,
- a seventh comparison element adapted to compare $\overline{\Delta u}_{Opq}$ with a selected voltage level $u_{Od}$ and, when $\overline{\Delta u}_{Opq}$ is greater than said voltage level, to deliver a logical "1"-signal on its output DO,
- an eighth comparison element adapted to compare $\overline{\Delta u}_{Opq}$ with a selected voltage level $-u_{Ob}$ and, when $\overline{\Delta u}_{Opq}$ is smaller than said voltage level, to deliver a logical "1"-signal on its output BO,
- a first or-element adapted to deliver on its output (FF) a logical "1"-signal indicating a fault lying ahead when any of DRS, DST, DTR or DO consists of a logical "1"-signal, and
- a second or-element adapted to deliver on its output (BB) a logical "1"-signal indicating a fault lying behind when any of BRS, BST, BTR or BO consists of a logical "1"-signal.

4. A device according to claim 3, further including a first and-element adapted to be supplied with signals from the outputs DRS, DST and DTR and to deliver on its output (A) a logical "1"-signal, a second and-element adapted to be supplied with signals from the outputs DRS, DST, DTR and DO and to deliver on its output (B) a logical "1"-signal when all of DRS, DST and DO have a logical "1"-signal and when DTR has a logical "0"-signal, a third and-element adapted to be supplied with signals from the outputs DRS, DST, DTR and DO and to deliver on its output (C) a logical "1"-signal when all of DRS, DTR and DO have a logical "1"-signal and when DST has a logical "0"-signal, a fourth and-element adapted to be supplied with signals from the outputs DRS, DST, DTR and DO and to deliver on its output (D) a logical "1"-signal when all of DST, DTR and DO have a logical "1"-signal and when DRS has a logical "0"-signal, a third or-element adapted to be supplied with signals from A and D and to deliver on its output (FT) a logical "1"-signal indicating a fault in phase T when either A or D has a logical "1"-signal, a fourth or-element adapted to be supplied with signals from A and C and to deliver on its output (FR) a logical "1"-signal indicating a fault in phase R when either A or C has a logical "1"-signal, and a fifth or-element adapted to be supplied with signals from A and B and to deliver on its output (FS) a logical "1"-signal indicating a fault in phase S when either A or B has a logical "1"-signal.

5. A method for directional detection of a fault on a power transmission line extending between two stations (P, Q), in one of which stations (P) there is a travelling wave model which, by means of currents and voltages measured in the station, calculates the voltage distribution along the line, the direction to a fault being determined by monitoring changes in calculated voltages in the two stations with a fault occurring between the stations, the voltage change occurring in a station (Q) between the voltage existing prior to a fault and after a fault is estimated as $|\Delta u_q|$, and the corresponding voltage change occurring in the other station (P) is estimated as $|\Delta u_p|$, whereby if the difference $|\Delta u_q| - |\Delta u_p| > 0$ the fault is taken to lie on the line side of the station (P), and if the difference $|\Delta u_q| - |\Delta u_p| < 0$ the fault is taken to lie behind the station (P).

* * * * *